3,049,545
Patented Aug. 14, 1962

3,049,545
PHOSPHINYLHYDROCARBYLOXY PHOSPHOR-
AMIDATES AND PHOSPHORODIAMIDATES
Gail H. Birum, Dayton, Ohio, assignor to Monsanto
Chemical Company, St. Louis, Mo., a corporation of
Delaware
No Drawing. Filed Nov. 12, 1959, Ser. No. 852,160
7 Claims. (Cl. 260—293.4)

The present invention relates to organic compounds of phosphorus and nitrogen.

An object of this invention is to provide a new and useful class of organic compounds containing pentavalent phosphorus and amido groups.

A more specific object is to provide a new and useful class of phosphinylhydrocarbyloxy esters of phosphoramidates and phosphorodiamidates.

Other objects of this invention will appear from the description hereinafter.

In copending application, S.N. 790,201, filed December 15, 1958, now U.S. Patent No. 3,014,910, there are disclosed and claimed new compounds of the formula

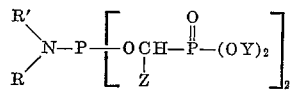

wherein R is an alkyl radical of from 1 to 5 carbon atoms, R' is selected from the class consisting of R and a benzenoid radical of from 6 to 7 carbon atoms and in which R and R' taken together stand for a bivalent alkylene radical of from 4 to 5 carbon atoms; Z is selected from the class consisting of hydrogen and hydrocarbyl radicals which are free from aliphatic unsaturation and which contain from 1 to 8 carbon atoms; and Y is selected from the group consisting of alkyl and haloalkyl radicals of from 1 to 8 carbon atoms.

Those compounds can be described as bis(phosphinylhydrocarbyloxy) phosphoramidites. In terms of phosphorus linkages which exist in the compounds they can be referred to as phosphoramidite-phosphonate type compounds.

According to the present invention, there is provided a new class of phosphinylhydrocarbyloxy phosphoramidates and phosphorodiamidates having the general formula

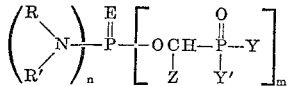

wherein R is an alkyl radical of from 1 to 5 carbon atoms, R' is selected from the group consisting of R and a benzenoid radical having from 6 to 7 carbon atoms, and R and R' taken together stand for a bivalent alkylene radical of from 2 to 5 carbon atoms; $n$ is an integer selected from 1 and 2; E is selected from the group consisting of oxygen and sulfur; Z is selected from the group consisting of hydrogen and hydrocarbyl radicals which are free from aliphatic unsaturation and have from 1 to 8 carbon atoms; Y and Y' are each selected from the group consisting of hydrocarbyl, hydrocarbyloxy, halohydrocarbyl, and halohydrocarbyloxy radicals which are free from aliphatic unsaturation and which contain from 1 to 8 carbon atoms; and $m$ is the integer 2 when $n$ is 1.

These compounds are phosphinylhydrocarbyloxy phosphoramidates and phosphorodiamidates, or when sulfur is attached to the indicated phosphorus atom they are phosphinylhydrocarbyloxy phosphoramidothioates and phosphorodiamidothioates. In terms of types of phosphorus linkages which exist in the compounds, they are classified as phosphoramidate-phosphonate, phosphoramidate-phosphinate, or phosphoramidate-phosphine oxide derivatives as well as phosphorodiamidate-phosphonate, phosphorodiamidate - phosphinate, and phosphorodiamidate-phosphine oxide derivatives. For example,

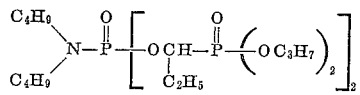

is O,O-bis[1-(dipropoxyphosphinyl)propyl] N-dibutylphosphoramidate and is classified in terms of phosphorus linkages as a phosphoramidate-phosphonate; whereas

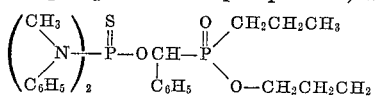

is O - α - [(propoxy)propylphosphinyl]benzyl N,N'-bis-(methylphenyl)phosphorodiamidothioate and is classified in terms of phosphorus linkages as a phosphorodiamidate-phosphinate; and

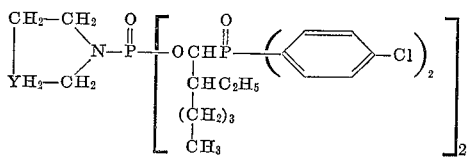

is O,O-bis{1-[bis(4-chlorophenyl)phosphinyl] - 2 - ethylhexyl}phosphorpyrrolidate, and is classified in terms of phosphorus linkages as a phosphoramidate-phosphine oxide derivative.

The compounds of this invention can be prepared by treating the phosphinylhydrocarbyloxy phosphoramidites and phosphorodiamidites with an oxidizing agent or with sulfur so as to obtain the respective phosphoramidate or phosphorodiamidate when an oxidizing agent is used and the respective phosphoramidothioate or phosphorodiamidothioate when sulfur is used. Thus, for example, by contacting a phosphorodiamidite-phosphonate, such as 1-[bis(2-chloroethoxy)phosphinyl]hexyl N,N'-bis-(diamyl)phosphorodiamidite with an oxidizing agent there is prepared the respective phosphorodiamidate-phosphonate, i.e., 1-[bis(2-chloroethoxy)phosphinyl]hexyl N,N'-bis(diamyl)phosphorodiamidate. When the above phosphorodiamidate-phosphonite is mixed with sulfur and slightly heated, O-1-[bis(2-chloroethoxy)phosphinyl]hexyl N,N'-bis(diamyl)phosphorodiamidothioate is prepared.

The examples given below illustrate the variations of the R, R', E, Z, Y and Y' groups in the initial reactants and the resulting products. Thus, I can react the following phosphoramidite-phosphonates and phosphorodiamidite-phosphonates for example, with an oxidizing agent to obtain the indicated phosphoramidate-phosphonates and phosphorodiamidate-phosphonates.

O,O - bis{1-[bis(2-chloroethoxy)phosphinyl]propyl}phosphorpyrrolidite to obtain O,O-bis{1-[bis(2-chloroethoxy)phosphinyl]propyl}phosphorpyrrolidate, O,O - bis[1 - (dimethoxyphosphinyl)ethyl] N-dimethylphosphoramidite to obtain O,O-bis[1-(dimethoxyphosphinyl)ethyl] N-dimethylphosphoramidate, O,O - bis{α - [bis(4-bromohexyloxy)phosphinyl]-p-ethylbenzyl} N-diethylphosphoramidite to obtain O,O-{α-[bis(4-bromohexyloxy)phosphinyl]-p-ethylbenzyl} N-diethylphosphoramidate, O,O - bis[1-(hexyloxyphenoxyphosphinyl)heptyl] N-dibutylphosphoramidite to obtain O,O-bis[1-(hexyloxyphenoxyphosphinyl)heptyl] N-dibutylphosphoramidate, O-1-[bis(2-4,6-trichlorophenoxy)phosphinyl]propyl N,N'-bis(dipropyl)phosphorodiamidite to obtain O-1-[bis(2, 4,6-trichlorophenoxy)phosphinyl]propyl N,N'-bis(dipropyl)phosphorodiamidate, O-α - [(2-chloropropoxy)(p-methylphenoxy)phosphinyl]

benzyl N,N'-bis(diisobutyl)phosphorodiamidite to obtain O - α - [(2-chloropropoxy)(p-methylphenoxy)phosphinyl]benzyl N,N' - bis(diisobutyl)phosphorodiamidate, and O - 1 - (octyloxychloroethoxyphosphinyl)-3-methylhexyl N,N'-bis-(diethyl)phosphorodiamidite to obtain O-1-(octyloxychloroethoxyphosphinyl)-3-methylhexyl N,N'-bis(diethyl)phosphorodiamidate.

When a phosphoramidite-phosphonate or phosphorodiamidite-phosphonate is reacted with sulfur, the respective phosphoramidothioate-phosphonate or phosphorodiamidothioate-phosphonate is formed. Examples of such reactants and the resulting products are:

O,O-bis{1-[bis(6 - chlorohexyloxy)phosphinyl]nonyl} N-dimethylphosphoramidite to obtain O,O-bis{1-[bis(6-chlorohexyloxy)phosphinyl]nonyl} N - dimethylphosphoramidothioate, O,O-bis-{α-[(p - ethylphenoxy)isopropoxyphosphinyl]-2-methylbenzyl} N-methyl-N-phenylphosphoramidite to obtain O,O-bis{α - [p - ethylphenoxy)isopropoxyphosphinyl]-2-methylbenzyl} N-methyl-N-phenylphosphoramidothioate, O,O-bis[1-(dibenzyloxyphosphinyl)-2-phenylethyl] N-dipropylphosphoramidite to obtain O,O-bis[1-(dibenzyloxyphosphinyl)-2 - phenylethyl] N - dipropylphosphoramidothioate, O-α[bis(2-bromo-4-methylphenoxy)phosphinyl]benzyl N,N'-bis(diamyl)-phosphorodiamidite to obtain O-α-[bis (2-bromo-4-methylphenoxy)-phosphinyl]benzyl N,N'-bis(diamyl)phosphorodiamidothioate, O-1-(chloroethoxypropoxyphosphinyl) - 2 - ethylhexyl N,N'-bis(ethylbenzyl)phosphorodiamidite to obtain O-1 (chloroethoxypropoxyphosphinyl)-2 - ethylhexyl N,N'-bis(ethylbenzyl)phosphorodiamidothioate, and O - α - [(2,4 - dimethylphenoxy)hexyloxyphosphinyl] - p-methylbenzyl phosphorodipiperidinite to obtain O-α-[(2,4-dimethylphenoxy)hexyloxyphosphinyl]-p-methylbenzyl phosphorodipiperidinothioate.

When a phosphoramidite-phosphinate or phosphorodiamiditephosphinate compound is treated with an oxidizing agent the respective phosphoramidate-phosphinite or phosphorodiamidate-phosphinate compounds are prepared. Examples of such reactants and the resulting products therefrom when they are reacted with an oxidizing agent are:

O,O-bis{1-[(2-ethylhexyloxy)(2 - ethylhexyl)phosphinyl]ethyl} N-diethylphosphoramidite to obtain O,O-bis{1-[(2-ethylhexyloxy)(2-ethylhexyl)phosphinyl]ethyl} N-diethylphosphoramidate, O,O-bis{α-[(2 - bromophenoxy)(cyclohexyl)phosphinyl]benzyl} N-butylphenylphosphoramidite to obtain O,O-bis{α - [(2 - bromophenoxy)(cyclohexyl)phosphinyl]benzyl} N-butylphenylphosphoramidate, O,O-bis{1 - [(propoxy)phenylphosphinyl]methyl} phosphorpyrrolidite to obtain O,O-bis{1-[(propoxy)phenylphosphinyl]methyl} phosphorpyrrolidate, O-1-[(p-tolyloxy)-p-tolylphosphinyl]propyl N,N'-bis(dibutyl)phosphorodiamidite to obtain O-1-[(p-tolyloxy)-p-tolylphosphinyl]propyl N,N'-bis(dibutyl)phosphorodiamidate, O-α-[(butoxy)benzylphosphinyl]-p - methylbenzyl N,N'-bis(methylphenyl)phosphorodiamidate to obtain O-α-[(butoxy)benzylphosphinyl]-p - methylbenzyl N,N'-bis (methylphenyl)phosphorodiamidate, and O-1[(pentyloxy)propylphosphinyl] - 2 - ethylhexyl N,N'-bis(ethyl-p-tolyl)phosphorodiamidite to obtain O-1-[(pentyloxy)propylphosphinyl] - 2-ethylhexyl N,N'-bis (ethyl-p-tolyl)phosphorodiamidate.

Examples of phosphoramidites-phosphinate and phosphorodiamidite-phosphinate reactants and the resulting thionated products are:

O,O-bis[1 - (propoxypropylphosphinyl)ethyl] N - diethylphosphoramidite to obtain O,O-bis[1-(propoxypropylphosphinyl)ethyl] N-diethylphosphoramidothioate, O,O-bis[α - (phenoxyethylphosphinyl)benzyl] N-propylphenylphosphoramidite to obtain O,O-bis[α-(phenoxyethylphosphinyl)benzyl] N-propylphenylphosphoramidothioate, O,O-bis{1 - [(4 - bromophenoxy)(4 - bromophenyl)phosphinyl]propyl} phosphoropiperidinite to obtain O,O-bis{1 - [(4 - bromophenoxy)(4 - bromophenyl)phosphinyl]propyl} phosphoropiperidinothioate, O-α-(methoxyphenylphosphinyl)benzyl N,N'-bis(butyl-2,4-dimethylphenyl)phosphorodiamidite to obtain O-α-(methoxyphenylphosphinyl) - benzyl N,N'-bis(butyl-2,4-dimethylphenyl)phosphorodiamidothioate, O-1-[(pentachlorophenoxy)phenylphosphinyl] - 3 -methylbutyl phosphorodipyrrolidite to obtain O-1-[(pentachlorophenoxy)phenylphosphinyl]-3-methylbutyl phosphorodipyrrolidothioate, and O-1 - (propoxycyclopentylphosphinyl)ethyl N,N'-bis(butylbenzyl)phosphorodiamidite to obtain O-1-(propoxycyclopentylphosphinyl)ethyl N,N' - bis(butylbenzyl)phosphorodiamidothioate.

Similarly, when a phosphoramidite-phosphine oxide or phosphorodiamidite-phosphine oxide compound is treated with an oxidizing agent, a phosphoramidate-phosphine oxide or phosphorodiamidate-phosphine oxide derivative is prepared. Examples of such reactants and the resulting products are:

O,O - bis[α - (diethylphosphinyl)benzyl] N - diethylphosphoramidite to obtain O,O-bis[α-(diethylphosphinyl) benzyl]N-diethylphosphoramidate, O,O-bis{1 - [(diethylphosphinyl]propyl} N-propylphenylphosphoramidite to obtain O,O-bis{1-[diethylphosphinyl]propyl} N-propylphenylphosphoramidate, O,O-bis[α-(hexylphenylphosphinyl)-4-ethylbenzyl] phosphoropyrrolidite to obtain O,O-bis[α-(hexylphenylphosphinyl)-4-ethylbenzyl]phosphoropyrrolidate, O-1 - [dihexylphosphinyl]methyl N,N' - bis(diethyl)phosphorodiamidite to obtain O-1-[dihexylphosphinyl]methyl N,N'-bis(diethyl)phosphorodiamidate, O-α-(diphenylphosphinyl)benzyl N,N'-bis(methylbenzyl)phosphorodiamidite to obtain O-α-(diphenylphosphinyl)benzyl N,N' - bis(methylbenzyl)phosphorodiamidate, and O-1-[(propyl)phenylphosphinyl]propyl N,N' - bis(dibutyl)phosphorodiamidite to obtain O-1-[(propyl)phenylphosphinyl]propyl N,N'-bis(dibutyl)phosphorodiamidate.

When a phosphoramidite-phosphine oxide or phosphorodiamidite-phosphine oxide compound of the above type is reacted with sulfur, the respective phosphoramidothioate-phosphine oxide or phosphorodiamidothioate-phosphine oxide derivative is formed. A few examples of such reactants and the resulting products are:

O,O-bis{1 - [dibutylphosphinyl]ethyl} N - dimethylphosphoramidite to obtain O,O-bis{1-[dibutylphosphinyl]ethyl} N-dimethylphosphoramidothioate, O,O-bis{α-[propyl(p-tolyl)phosphinyl]benzyl} N-methylphenylphosphoramidite to obtain O,O-bis{α-[propyl (p-tolyl)phosphinyl]benzyl} N-methylphenylphosphoramidothioate, O,O - bis{1 - [bis(2,4 - dimethylphenyl)phosphinyl]hexyl} phosphoropiperidite to obtain O,O-bis{1-[bis(2,4-dimethylphenyl)phosphinyl]hexyl} phosphoropiperidinothioate, O - 1 - (diethylphosphinyl)propyl N,N'-bis(methylphenyl) phosphorodiamidite to obtain O-1-(diethylphosphinyl) propyl N,N'-bis(methylphenyl)phosphorodiamidothioate, O-α-[diphenylphosphinyl]-p - methylbenzyl N,N' - bis(diethyl)phosphorodiamidite to obtain O-α-[diphenylphosphinyl] -p - methylbenzyl N,N'-bis(diethyl)phosphorodiamidothioate, O-1-(methylphenylphosphinyl)propyl N,N'-bis(dipropyl)phosphorodiamidite to obtain O-1-(methylphenylphosphinyl)propyl N,N' - bis(dipropyl)phosphorodiamidothioate, O,O-bis{1 - [dipentylphosphinyl]heptyl} N - diethylphosphoramidite to obtain O,O-bis{1-[dipentylphosphinyl]heptyl} N-diethylphosphoramidothioate, O,O-bis[α-dibutylphosphinyl)benzyl] N-ethylphenylphosphoramidite to obtain O,O-bis[α-(dibutylphosphinyl)benzyl] N-ethylphenylphosphoramidothioate, O,O-bis[(diphenylphosphinyl)methyl] N - dipropylphosphoramidite to obtain O,O-bis[(diphenylphosphinyl)methyl] N-dipropylphosphoramidothioate, O-α-[(isopropyl)phenylphosphinyl]-2-methylbenzyl phosphorodipiperidite to obtain O-α-[(isopropyl)phenylphosphinyl] - 2 - methylbenzyl phosphorodipiperidinothioate, O-1-(dihexylphosphinyl)propyl N,N'-bis(dimethyl)phosphorodiamidite to obtain O-1-(dihexylphosphinyl)propyl N,N' - bis(dimethyl)phosphorodiamidothioate, and O-α-[(propyl)phenylphosphinyl]benzyl N,N'-bis(diamyl)phosphorodiamidite to obtain O-α-[(propyl)phenylphosphinyl]benzyl N,N'-bis(diamyl)phosphorodiamidothioate.

I have found that a wide variety of oxidizing chemicals convert the trivalent phosphorus atom of the phosphoramidite and phosphorodiamidite starting materials to the pentavalent state and supply an oxygen atom thereto without disturbing the linkages of that phosphorus atom to the other groups of the molecule. Some of the preferred chemicals for making the compounds of this invention are the peroxycarboxylic acids, both aromatic and aliphatic, hydroperoxides, hydrogen peroxide, ozone, oxygen, and nitrogen oxides such as nitrogen tetroxide. Air may be used but it is not preferred. Although the more common inorganic oxidizing agents, such as $KMnO_4$, $CrO_3$, etc. would accomplish the oxidation, they are not desirable for reasons of expense, salt by-product complications, etc. To prepare the phosphoramidothioates and phosphorodiamidothioates of this invention, elemental sulfur in any of its known forms is used. It may be in the form of sulfur flowers, powder, crystals, or as amorphous sulfur.

In either case, i.e., whether the phosphoramidates or phosphoramidothioates are being prepared, the respective phosphoramidite is usually contacted with a stoichiometric amount or slight excess of oxidizing agent or sulfur while stirring the mixture. Any excess oxidizing agent or sulfur can easily be recovered by known physical means, e.g. filtration, volatilization, extraction, etc.

Reaction between the phosphoramidite or phosphorodiamidite starting material and the oxidizing agent or sulfur will usually take place at room temperature at least to some extent. However, when using the highly reactive oxidizing agents, such as hydrogen peroxide and ozone it is oftentimes preferred to cool the reaction mixture, generally to between —70 to 20° C., depending upon which phosphoramidite compound and oxidizing agent are combined, to control the speed of the resulting exothermic reaction. On the other hand, reaction of the respective phosphoramidites and phosphorodiamidites with sulfur is usually most practically accomplished by warming the reaction mixture to from 50° C. to 180° C. to insure complete reaction.

The oxidation or thionation of the phosphoramidite and phosphorodiamidite starting materials is readily conducted in the absence of an inert solvent or catalyst. However solvents and catalysts may be employed. The use of solvents is particularly advantageous when working with the highly active oxidizing agents or the more viscous phosphorodiamidites and phosphoramidites. Such solvents may be, e.g., benzene, toluene, xylene, hexane, dioxane, or alkylene halides, such as methylene chloride and methylene bromide, or mixtures of such solvents. No particular order or method of contacting the reactants need be employed. However, we usually add the oxidizing agent or sulfur to the phosphoramidite reactant portionwise to avoid unduly exothermic reactions and waste of reactants.

The products of this invention are stable, usually high-boiling materials which range from viscous liquids to waxy, or crystalline solids. They are useful as plasticizers, functional fluids, and dielectrics. They are useful as biological toxicants in quantities ranging from 1 to 10 parts per million up to 10,000 parts per million, depending upon the organism being treated. They are useful as lead scavengers in leaded gasolines, the quantity depending upon the amount of lead in the gasoline but generally ranging from 0.05 to 10.0 moles per mole of lead in the gasoline. They are useful as fire-retardant additives in quantities ranging from 0.5 to 25% or more by weight in many polymeric materials such as urea-formaldehyde, phenol-formaldehyde, epoxy, and other oxygen containing resins, in polyester compositions such as polyterephthalate, polyacrylonitrile, and polyamide polymers and condensation products used to make fibers, in urethane, styrene and other foam materials, in rubber based emulsion type coatings as well as in cellulosic and hydrocarbon materials. In the higher concentration ranges, say, in concentrations which may be equivalent by weight to the weight of the polymeric material, plasticizing properties will likewise often be demonstrated. They are useful as gear and lubricant oil and grease additives.

*Example 1*

To 26.1 g. (0.056 mole) of O-1-[bis(2-chloropropoxy)phosphinyl]propyl bis(N - diethyl)phosphorodiamidite there was added 8.8 g. (0.056 mole) of propylene trimer hydroperoxide dropwise in 10 minutes at 28°–38° C. while stirring and using an ice bath to cool the mixture when necessary. When the addition was completed the mixture was stirred until no further reaction was apparent and then heated to 55° C. to insure complete reaction. The mixture was then concentrated to 115° C./0.15 mm., during which treatment the propylene trimer alcohol was distilled out. The product O-1-[bis(2-chloropropoxy)phosphinyl]propyl bis(N - diethyl)phosphorodiamidate was obtained as a viscous orange liquid. The yield was essentially quantitative.

*Example 2*

A 500 ml. flask equipped with a stirrer, thermometer, and condenser, was charged with 67.9 g. (0.128 mole) of O,O-bis[1 - (diethoxyphosphinyl)propyl] N-methylphenylphosphoramidite. Then 3.3 g. of sulfur was added and the resulting mixture was stirred for 15 minutes during which time the temperature of the mixture increased spontaneously to 5° C. above room temperature. The mixture was then heated gradually to 130° C., to promote reaction of all the sulfur present. The mixture was cooled to 70° C. and 0.5 g. more of sulfur was added and then the mixture was heated to 120° C. to insure complete reaction. There was then obtained O,O-bis[1-(diethoxyphosphinyl)propyl] N - methylphenylphosphoramidothioate as a viscous, orange liquid.

*Example 3*

A 500 ml. flask equipped with a stirrer, thermometer, and condenser was charged with 34.9 g. (0.075 mole) of O-1-[bis(2 - chloropropoxy)phosphinyl]propyl bis(N-diethyl)phosphorodiamidite. Then 2.0 g. of sulfur was added and the mixture stirred for 10 minutes during which time the temperature increased spontaneously from 25° C. to 42° C. before it diminished. Heating was then initiated and the mixture was gradually heated to 148° C.

while stirring. The product, O-1-[bis(2-chloropropoxy)phosphinyl]propyl bis(N-diethyl)phosphorodiamidothioate was obtained as a deep red, viscous liquid.

*Example 4*

To a 500 ml. flask equipped as in Example 1, there was added 37.2 g. (0.045 mole) of O,O-bis[α-(dihexyloxyphosphinyl)benzyl]phosphoropiperidite and then 1.1 g. of sulfur. The mixture was stirred for 15 minutes during which time the temperature increased spontaneously from 23° C. to 33° C. The mixture was then heated to 130° C. at which temperature all of the sulfur had reacted. Another 0.2 g. of sulfur was added and heating was resumed at 130° C. The product, O,O-bis[α-(dihexyloxyphosphinyl)benzyl]phosphoropiperidinothioate was obtained as a viscous yellow liquid.

*Example 5*

A 500 ml. flask equipped with a stirrer, thermometer, condenser with drying tube, and a dropping funnel, was charged with 5.4 g. (0.043 mole) of 2-ethylhexaldehyde and 8.5 g. (0.043 mole) of diethyl phenylphosphonite. Then 9.05 g. of bis(N-diethyl)phosphorodiamidous chloride was added dropwise in two minutes, resulting in a 1° C. temperature rise. The mixture was then stirred for 10 minutes during which time the temperature of the mixture increased spontaneously to 35° C. from room temperature. The mixture was then heated to 75° C. to insure complete reaction. After cooling, the mixture was placed under water pump vacuum and heated to 90° C. to remove the ethyl chloride by-product.

To 19.8 g. (0.042 mole) of the above prepared product, O-1-(phenylethoxyphosphinyl)-2-ethylhexyl bis(N-diethyl) phosphorodiamidite, 1.1 g. of sulfur was added. The temperature of the mixture increased rapidly to 50° C. before leveling off. Another 0.2 g. of sulfur was added. The temperature again increased spontaneously to 54° C. Heating was intitiated and the mixture was heated to 130° C. to insure complete reaction. The product, O-1-(phenylethoxyphosphinyl)-2-ethylhexyl bis(N-diethyl)phosphorodiamidothioate, was obtained as a pale yellow, slightly cloudy liquid.

I claim:

1. A compound of the formula

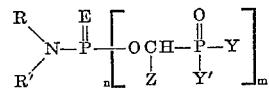

wherein R is an alkyl of from 1 to 5 carbon atoms; R' is selected from the group consisting of alkyl of from 1 to 5 carbon atoms, phenyl, tolyl, benzyl, 2,4-dimethylphenyl, and in which R and R' taken together with the nitrogen atom to which they are attached denote a heterocyclic of the group consisting of pyrrolidyl, and piperidyl; $n$ is an integer of from 1 to 2; Z is selected from the group consisting of hydrogen, alkyl of from 1 to 8 carbon atoms, benzyl, phenyl, tolyl, and p-ethylphenyl; Y and Y' are each selected from the group consisting of alkoxy, chlorinated alkoxy groups of from 1 to 8 carbon atoms, and phenyl; $m$ is the integer 1 when $n$ is 2, and is the integer 2 when $n$ is 1; and E is selected from the group consisting of oxygen and sulfur.

2. O,O-bis[1-(diethoxyphosphinyl) propyl] N-methyl-N-phenylphosphoramidothiate.

3. O,O - bis[(dialkoxyphosphinyl)benzyl] piperidinothioate having from 1 to 8 carbon atoms in each alkoxy radical.

4. O,O-bis[α-(dihexyloxyphosphinyl)benzyl] phosphoropiperidinothioate.

5. O-1-(phenylethoxyphosphinyl)-2 - ethylhexyl bis(N-diethyl)phosphorodiamidothiate.

6. O-1[bis(2-chloropropoxy)phosphinyl]propyl bis (N-diethyl) phosphorodiamidothioate.

7. O-1-[bis(2-chloropropoxy)phosphinyl]propyl bis(N-diethyl)phosphorodiamidate.

No references cited.

UNITED STATES PATENT OFFICE
CERTIFICATE OF CORRECTION

Patent No. 3,049,545            August 14, 1962

Gail H. Birum

It is hereby certified that error appears in the above numbered patent requiring correction and that the said Letters Patent should read as corrected below.

Column 2, lines 21 to 27, the formula should appear as shown below instead of as in the patent:

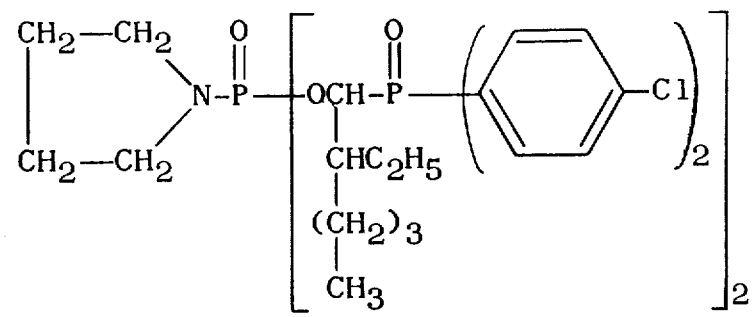

column 8, lines 6 to 10, the formula should appear as shown below instead of as in the patent:

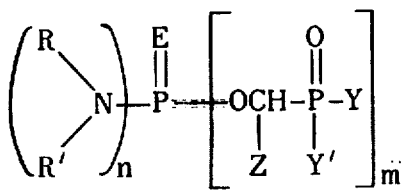

Signed and sealed this 11th day of December 1962.

(SEAL)
Attest:

ERNEST W. SWIDER            DAVID L. LADD
Attesting Officer           Commissioner of Patents